(12) United States Patent
Lee et al.

(10) Patent No.: US 10,419,343 B2
(45) Date of Patent: *Sep. 17, 2019

(54) METHOD FOR TRANSMITTING OR RECEIVING A MAC PDU IN A WIRELESS COMMUNICATION SYSTEM AND A DEVICE THEREFOR

(71) Applicant: LG ELECTRONICS INC., Seoul (KR)

(72) Inventors: Sunyoung Lee, Seoul (KR); Seungjune Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/258,151

(22) Filed: Jan. 25, 2019

(65) Prior Publication Data

US 2019/0199629 A1 Jun. 27, 2019

Related U.S. Application Data

(63) Continuation of application No. 15/769,321, filed as application No. PCT/KR2016/009867 on Sep. 2, 2016.

(60) Provisional application No. 62/256,043, filed on Nov. 16, 2015.

(51) Int. Cl.
*H04L 12/741* (2013.01)
*H04L 1/00* (2006.01)
(Continued)

(52) U.S. Cl.
CPC ............ *H04L 45/74* (2013.01); *H04L 1/0079* (2013.01); *H04L 5/001* (2013.01); *H04L 61/6022* (2013.01); *H04W 84/042* (2013.01)

(58) Field of Classification Search
CPC ....... H04L 45/74; H04L 1/0079; H04L 5/001; H04L 61/6022; H04W 84/042
See application file for complete search history.

(56) References Cited

U.S. PATENT DOCUMENTS

2012/0224552 A1* 9/2012 Feuersanger ......... H04L 5/0007
370/329
2013/0089057 A1 4/2013 Worrall et al.
(Continued)

FOREIGN PATENT DOCUMENTS

EP 2086276 8/2009
WO 2015108373 7/2015

OTHER PUBLICATIONS

Ericsson, "LCIDs for extended MAC CEs for CA enhancements beyond 5 CCs", 3GPP TSG RAN WG2 Meeting #91bis, R2-154639, Oct. 2015, 3 pages.

(Continued)

*Primary Examiner* — Ian N Moore
*Assistant Examiner* — Latresa A McCallum
(74) *Attorney, Agent, or Firm* — Lee Hong Degerman Kang Waimey

(57) ABSTRACT

The present invention relates to a wireless communication system. More specifically, the present invention relates to a method and a device for transmitting or receiving a MAC PDU in a wireless communication system, the method comprising: setting a LCID field in a MAC subheader to a first value indicating that an eLCID field is included in the MAC subheader when a MAC PDU including the LCID field and the eLCID field is to be generated, setting the eLCID field to a second value identifying a logical channel of a MAC SDU or a type of a MAC CE, and generating and transmitting the MAC PDU including the LCID field and the eLCID field, and the MAC SDU or the MAC CE.

19 Claims, 9 Drawing Sheets

(51) Int. Cl.
   *H04L 29/12*   (2006.01)
   *H04W 84/04*  (2009.01)
   *H04L 5/00*   (2006.01)

(56) References Cited

U.S. PATENT DOCUMENTS

2015/0110063 A1    4/2015  Zhang et al.
2016/0057055 A1*   2/2016  Barrett .................... H04L 45/74
                                                        370/329
2018/0316610 A1    11/2018 Lee et al.

OTHER PUBLICATIONS

ZTE, "UP issues of SC-PTM", 3GPP TSG RAN WG2 Meeting #91bis, R2-154879, Oct. 2015, 5 pages.
Huawei,"[91bix#26][LTE/CA-enh] L field in MAC header", 3GPP TSG RAN WG2 Meeting #92, R2-156465, Nov. 2015, 8 pages.
Ericsson, "Open issues on L2 UP headers extension", 3GPP TSG RAN WG2 Meeting #92, R2-156640, Nov. 2015, 4 pages.
PCT International Application No. PCT/KR2016/009867, International Search Report dated Nov. 28, 2016, 8 pages.
Huawei, et al., "New LCID(s) for activation command and extended PHR MAC CE", 3GPP TSG RAN WG2 Meeting #91bis, R2-154185, Oct. 2015, 3 pages.
LG Electronics, "LCID for PHR and A/D MAC CE", 3GPP TSG RAN WG2 Meeting #91bis, R2-154320, Oct. 2015, 4 pages.
European Patent Office Application Serial No. 16866533.9, Search Report dated Jun. 13, 2019, 7 pages.

* cited by examiner

[Fig. 1]
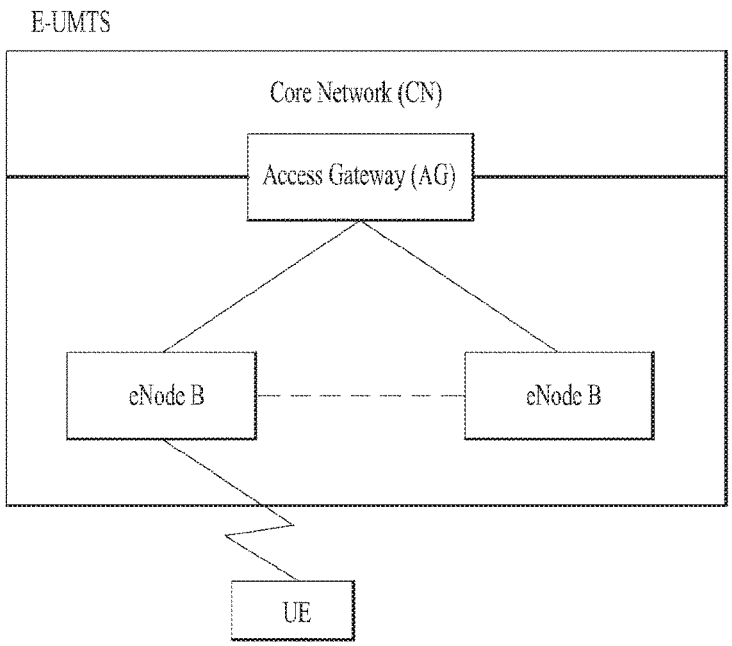
[Fig. 2A]
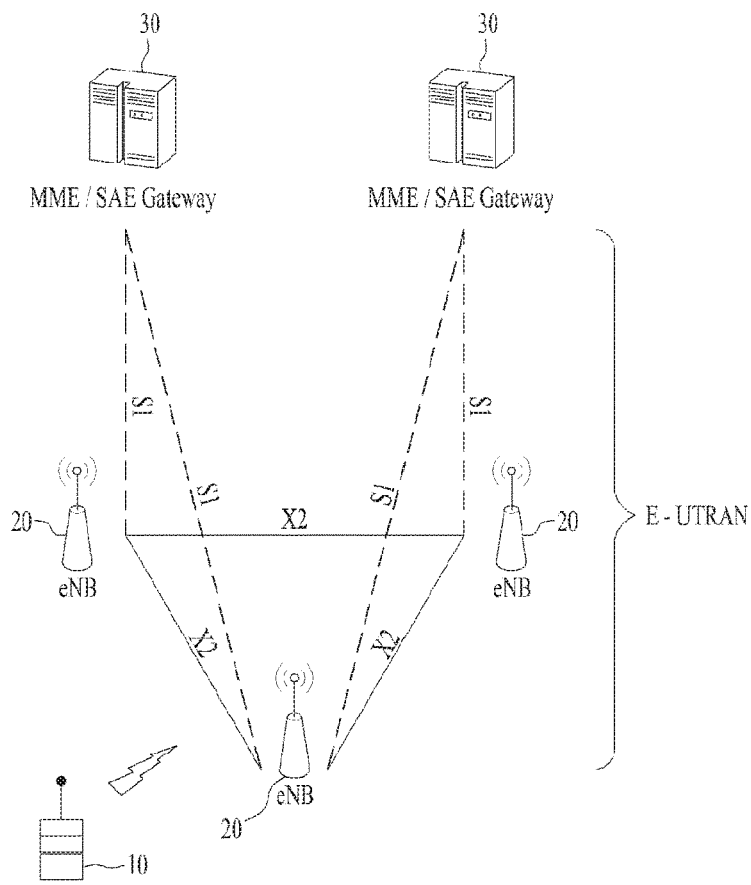

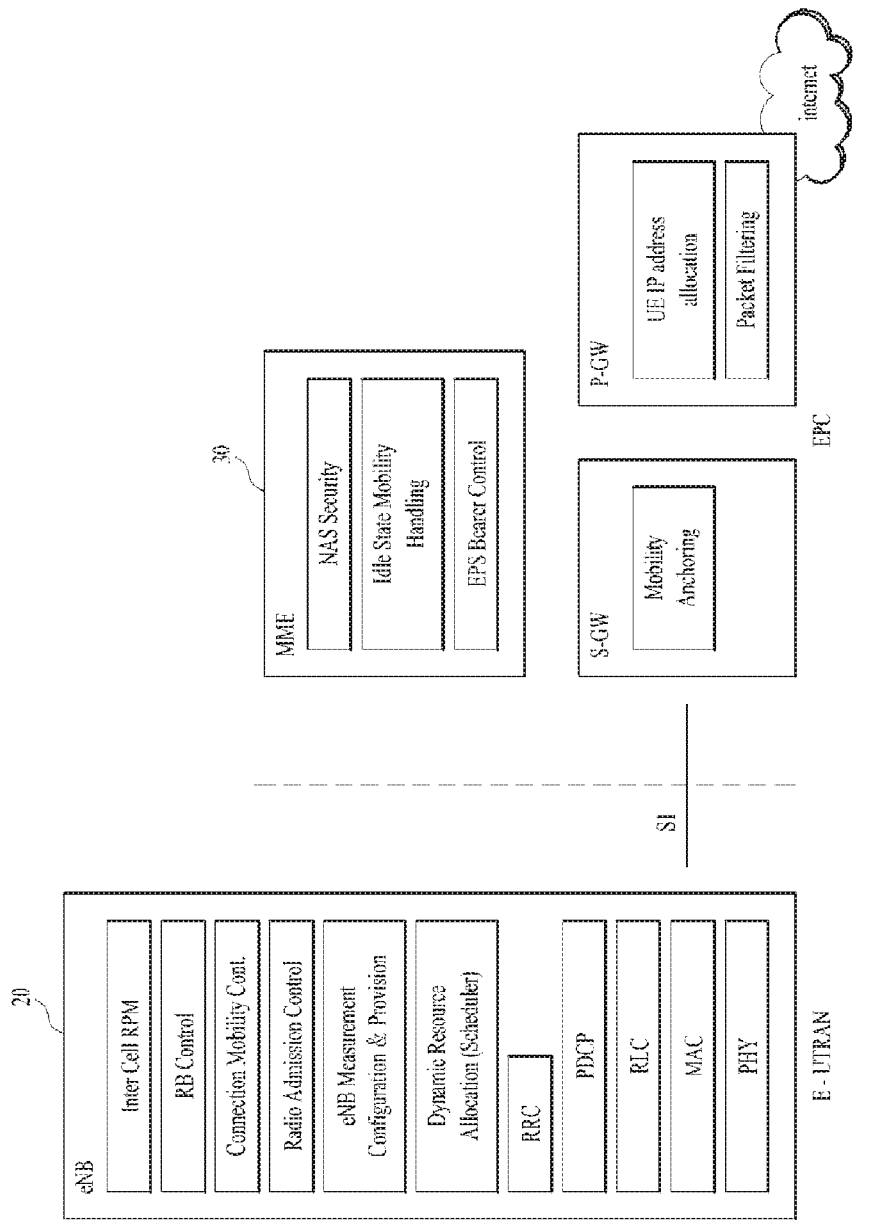
[Fig. 2B]

[Fig. 3]
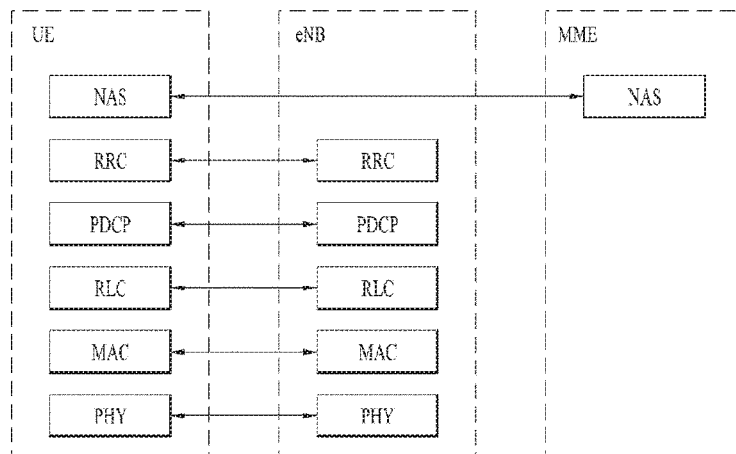
(a) Control-Plane Protocol Stack
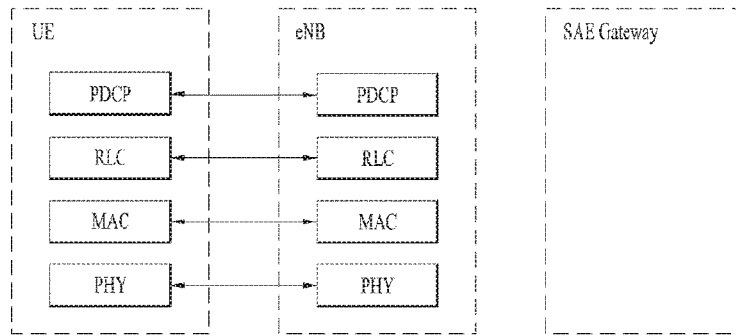
(b) User-Plane Protocol Stack
[Fig. 4]
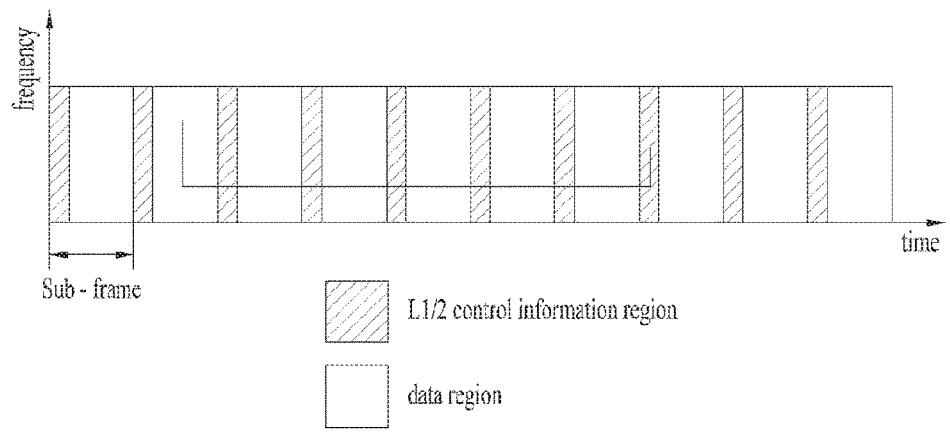

[Fig. 5]
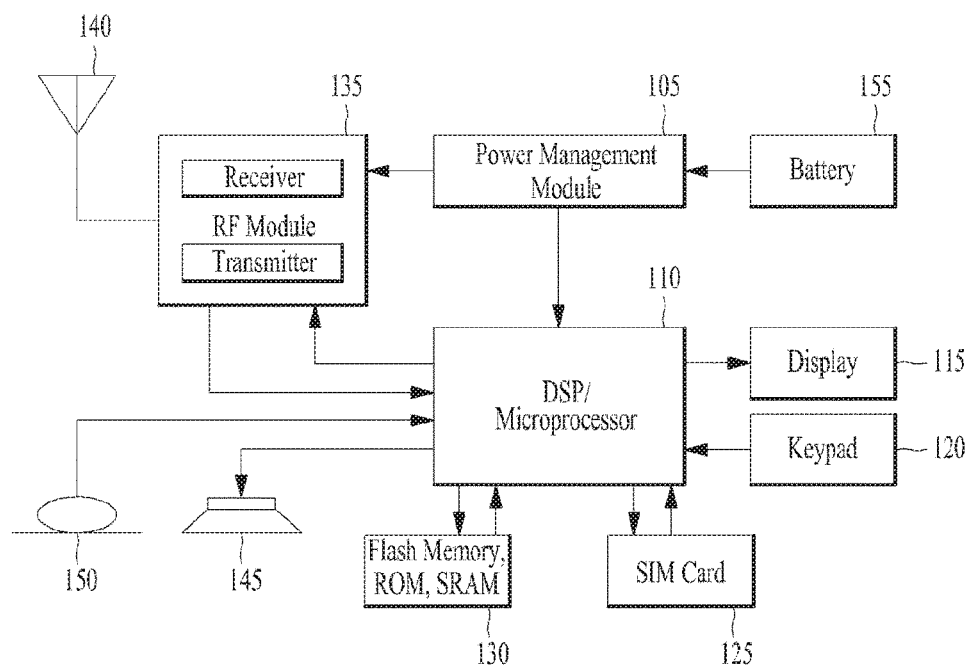

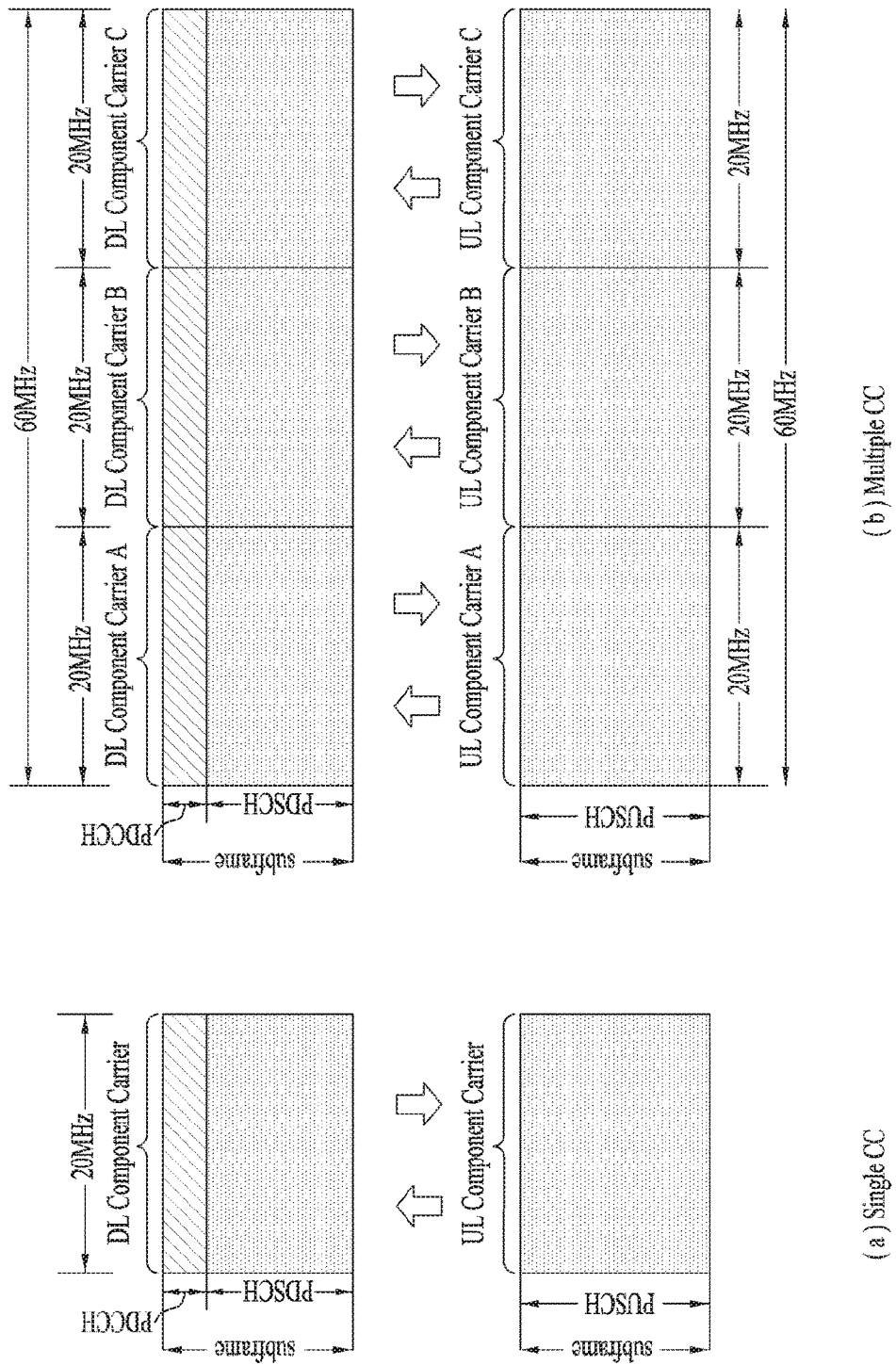
[Fig. 6]

[Fig. 7]
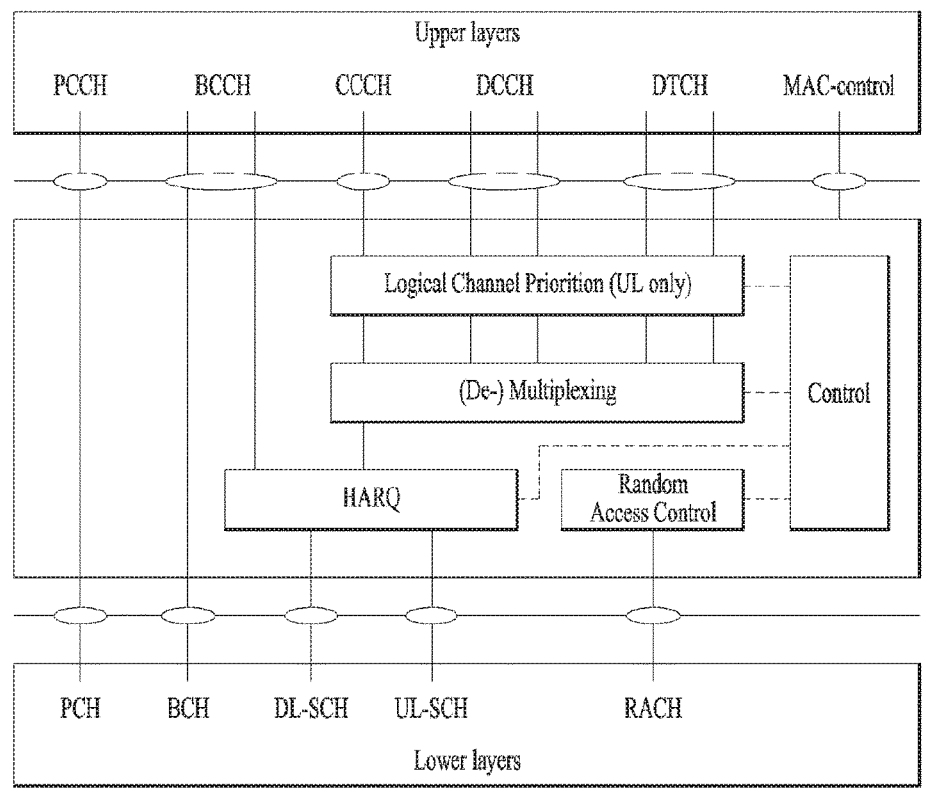

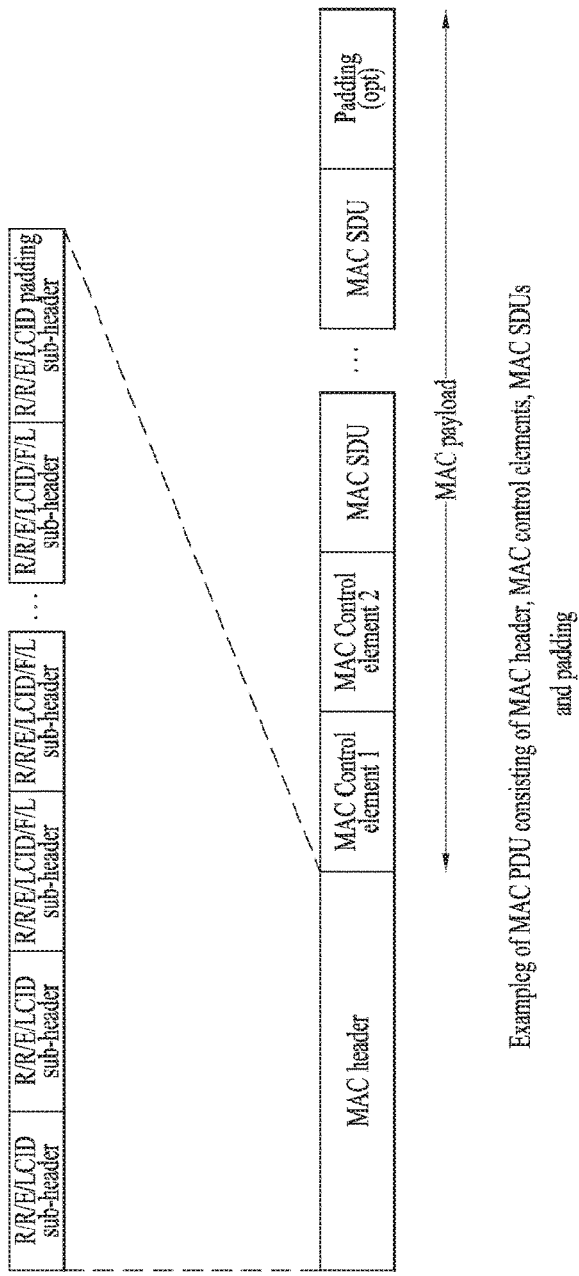

[Fig. 9B]
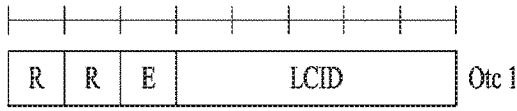
R/R/E/LCID sub-header
[Fig. 10]
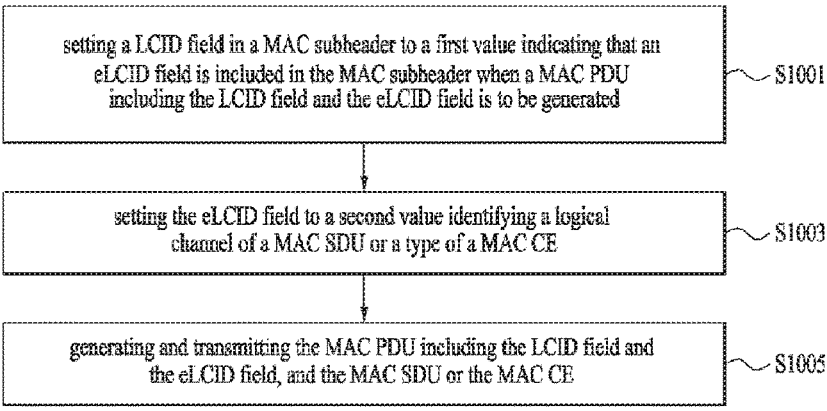
[Fig. 11]
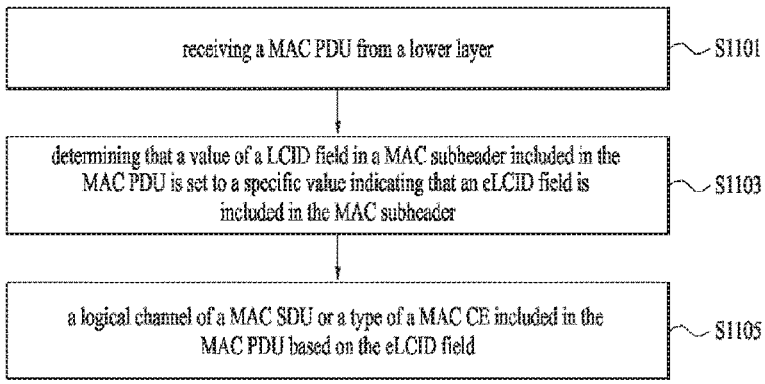
[Fig. 12A]
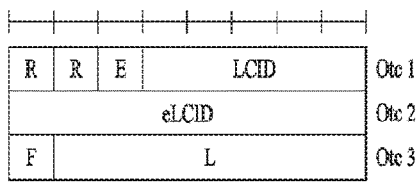 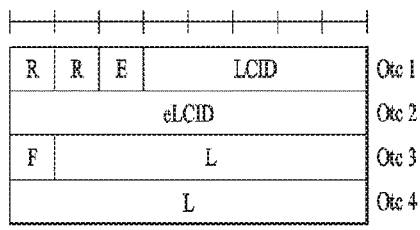
R/R/E/LCID/eLCID/F/L MAC subheader with 7-bits L field
R/R/E/LCID/eLCID/F/L MAC subheader with 15-bits L field

[Fig. 12B]

| R | R | E | LCID | Otc 1 |
| eLCID | | | | Otc 2 |

R/R/E/LCID/eLCID MAC subheader

[Fig. 13A]

| R | R | E | LCID | Otc 1 |
| R | R | R | eLCID | Otc 2 |
| F | L | | | Otc 3 |

R/R/E/LCID/R/R/R/eLCID/F/L MAC subheader
with 7-bits L field

| R | R | E | LCID | Otc 1 |
| R | R | R | eLCID | Otc 2 |
| F | L | | | Otc 3 |
| L | | | | Otc 4 |

R/R/E/LCID/R/R/R/eLCID/F/L MAC subheader
with 15-bits L field

[Fig. 13B]

| R | R | E | LCID | Otc 1 |
| R | R | R | eLCID | Otc 2 |

R/R/E/LCID/R/R/R/eLCID MAC subheader

[Fig. 13C]

| R | R | E | LCID | Otc 1 |
| R | R | F2 | eLCID | Otc 2 |
| L | | | | Otc 3 |
| L | | | | Otc 4 |

R/R/E/LCID/R/R/F2/eLCID/L MAC subheader
with 15-bits L field

METHOD FOR TRANSMITTING OR RECEIVING A MAC PDU IN A WIRELESS COMMUNICATION SYSTEM AND A DEVICE THEREFOR

CROSS-REFERENCE TO RELATED APPLICATIONS

This application is a continuation of U.S. patent application Ser. No. 15/769,321, filed on Apr. 18, 2018, currently pending, which is the National Stage filing under 35 U.S.C. 371 of International Application No. PCT/KR2016/009867, filed on Sep. 2, 2016, which claims the benefit of U.S. Provisional Application No. 62/256,043, filed on Nov. 16, 2015, the contents of which are all hereby incorporated by reference herein in their entirety.

TECHNICAL FIELD

The present invention relates to a wireless communication system and, more particularly, to a method for transmitting or receiving a medium access control (MAC) protocol data unit (PDU) in a wireless communication system and a device therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

DISCLOSURE OF INVENTION

Technical Problem

An object of the present invention devised to solve the problem lies in a method and device for transmitting or receiving a MAC PDU in a wireless communication system. The technical problems solved by the present invention are not limited to the above technical problems and those skilled in the art may understand other technical problems from the following description.

Solution to Problem

The object of the present invention can be achieved by providing a method for User Equipment (UE) operating in a wireless communication system as set forth in the appended claims.

In another aspect of the present invention, provided herein is a communication apparatus as set forth in the appended claims.

It is to be understood that both the foregoing general description and the following detailed description of the present invention are exemplary and explanatory and are intended to provide further explanation of the invention as claimed.

Advantageous Effects of Invention

In order to design a new MAC subheader by considering both of future extensibility and signaling overhead, it is invented that an extended MAC PDU includes an extended logical channel identity (LCID) value indicator (hereinafter, eLCIDIndicator) indicating that an extended LCID value is included in the MAC PDU, wherein the eLCIDIndicator is one of the non-extended LCID values.

It will be appreciated by persons skilled in the art that the effects achieved by the present invention are not limited to what has been particularly described hereinabove and other advantages of the present invention will be more clearly understood from the following detailed description taken in conjunction with the accompanying drawings.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 1 is a diagram showing a network structure of an Evolved Universal Mobile Telecommunications System (E-UMTS) as an example of a wireless communication system;

FIG. 2A is a block diagram illustrating network structure of an evolved universal mobile telecommunication system (E-UMTS), and FIG. 2B is a block diagram depicting architecture of a typical E-UTRAN and a typical EPC;

FIG. 3 is a diagram showing a control plane and a user plane of a radio interface protocol between a UE and an E-UTRAN based on a 3rd generation partnership project (3GPP) radio access network standard;

FIG. 4 is a view showing an example of a physical channel structure used in an E-UMTS system;

FIG. 5 is a block diagram of a communication apparatus according to an embodiment of the present invention;

FIG. 6 illustrates an example of CCs and CA in the LTE-A system, which are used in embodiments of the present disclosure;

FIG. 7 is a diagram for MAC structure overview in a UE side;

FIG. 8 is a diagram for MAC PDU consisting of MAC header, MAC control elements, MAC SDUs and padding;

FIGS. 9A and 9B are examples for MAC PDU subheader structures;

FIG. 10 is conceptual diagram for a transmitter's operation for transmitting a MAC PDU according to an exemplary embodiment of the present invention;

FIG. 11 is conceptual diagram for a receiver's operation for receiving a MAC PDU according to an exemplary embodiment of the present invention;

FIGS. 12A and 12B show an example of MAC subheader formats according to an exemplary embodiment of the present invention; and FIGS. 13A to 13C show another example of MAC subheader formats according to an exemplary embodiment of the present invention.

BEST MODE FOR CARRYING OUT THE INVENTION

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20. NAS signaling security, AS Security control. Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication. Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception. UE IP address allocation, Transport level packet marking in the downlink, UL and DL service level charging, gating and rate enforcement. DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

FIG. 5 is a block diagram of a communication apparatus according to an embodiment of the present invention.

The apparatus shown in FIG. 5 can be a user equipment (UE) and/or eNB adapted to perform the above mechanism, but it can be any apparatus for performing the same operation.

As shown in FIG. 5, the apparatus may comprises a DSP/microprocessor (110) and RF module (transceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 5 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 5 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

FIG. 6 illustrates an example of CCs and CA in the LTE-A system, which are used in embodiments of the present disclosure.

A 3GPP LTE system (hereinafter, referred to as an LTE system) uses Multi-Carrier Modulation (MCM) in which a single Component Carrier (CC) is divided into a plurality of bands. In contrast, a 3GPP LTE-A system (hereinafter, referred to an LTE-A system) may use CA by aggregating one or more CCs to support a broader system bandwidth than the LTE system. The term CA is interchangeably used with carrier combining, multi-CC environment, or multi-carrier environment.

In the present disclosure, multi-carrier means CA (or carrier combining). Herein, CA covers aggregation of contiguous carriers and aggregation of non-contiguous carriers. The number of aggregated CCs may be different for a DL and a UL. If the number of DL CCs is equal to the number of UL CCs, this is called symmetric aggregation. If the number of DL CCs is different from the number of UL CCs, this is called asymmetric aggregation. The term CA is interchangeable with carrier combining, bandwidth aggregation, spectrum aggregation, etc.

The LTE-A system aims to support a bandwidth of up to 100 MHz by aggregating two or more CCs, that is, by CA. To guarantee backward compatibility with a legacy IMT system, each of one or more carriers, which has a smaller bandwidth than a target bandwidth, may be limited to a bandwidth used in the legacy system.

For example, the legacy 3GPP LTE system supports bandwidths {1.4, 3, 5, 10, 15, and 20 MHz} and the 3GPP LTE-A system may support a broader bandwidth than 20 MHz using these LTE bandwidths. A CA system of the present disclosure may support CA by defining a new bandwidth irrespective of the bandwidths used in the legacy system.

There are two types of CA, intra-band CA and inter-band CA. Intra-band CA means that a plurality of DL CCs and/or UL CCs are successive or adjacent in frequency. In other words, the carrier frequencies of the DL CCs and/or UL CCs are positioned in the same band. On the other hand, an environment where CCs are far away from each other in frequency may be called inter-band CA. In other words, the carrier frequencies of a plurality of DL CCs and/or UL CCs are positioned in different bands. In this case, a UE may use a plurality of Radio Frequency (RF) ends to conduct communication in a CA environment.

The LTE-A system adopts the concept of cell to manage radio resources. The above-described CA environment may be referred to as a multi-cell environment. A cell is defined as a pair of DL and UL CCs, although the UL resources are not mandatory. Accordingly, a cell may be configured with DL resources alone or DL and UL resources.

For example, if one serving cell is configured for a specific UE, the UE may have one DL CC and one UL CC. If two or more serving cells are configured for the UE, the UE may have as many DI. CCs as the number of the serving cells and as many UL CCs as or fewer UL CCs than the number of the serving cells, or vice versa. That is, if a plurality of serving cells are configured for the UE, a CA environment using more UL CCs than DL CCs may also be supported.

CA may be regarded as aggregation of two or more cells having different carrier frequencies (center frequencies). Herein, the term 'cell' should be distinguished from 'cell' as a geographical area covered by an eNB. Hereinafter, intra-band CA is referred to as intra-band multi-cell and inter-band CA is referred to as inter-band multi-cell.

FIG. 6(a) illustrates a single carrier structure in the LTE system. There are a DL CC and a UL CC and one CC may have a frequency range of 20 MHz.

FIG. 6(b) illustrates a CA structure in the LTE-A system. In the illustrated case of FIG. 6(b), three CCs each having 20 MHz are aggregated. While three DL CCs and three UL CCs are configured, the numbers of DL CCs and UL CCs are not limited. In CA, a UE may monitor three CCs simultaneously, receive a DL signal/DL data in the three CCs, and transmit a UL signal/UL data in the three CCs.

FIG. 7 is a diagram for MAC structure overview in a UE side.

The MAC layer handles logical-channel multiplexing, hybrid-ARQ retransmissions, and uplink and downlink scheduling. It is also responsible for multiplexing/demultiplexing data across multiple component carriers when carrier aggregation is used.

The MAC provides services to a radio link control (RLC) in the form of logical channels. A logical channel is defined by the type of information it carries and is generally classified as a control channel, used for transmission of control and configuration information necessary for operating an LTE system, or as a traffic channel, used for the user data. The set of logical-channel types specified for LTE includes:

The Broadcast Control Channel (BCCH), used for transmission of system information from the network to all terminals in a cell. Prior to accessing the system, a terminal needs to acquire the system information to find out how the system is configured and, in general, how to behave properly within a cell.

The Paging Control Channel (PCCH), used for paging of terminals whose location on a cell level is not known to the network. The paging message therefore needs to be transmitted in multiple cells.

The Common Control Channel (CCCH), used for transmission of control information in conjunction with random access.

The Dedicated Control Channel (DCCH), used for transmission of control information to/from a terminal. This channel is used for individual configuration of terminals such as different handover messages.

The Multicast Control Channel (MCCH), used for transmission of control information required for reception of the MTCH.

The Dedicated Traffic Channel (DTCH), used for transmission of user data to/from a terminal. This is the logical channel type used for transmission of all uplink and non-MBSFN downlink user data.

The Multicast Traffic Channel (MTCH), used for downlink transmission of MBMS services.

The MAC entity shall multiplex MAC control elements and MAC service data units (SDUs) in a MAC protocol data unit (PDU). Or, The MAC entity shall disassemble and demultiplex a MAC PDU.

FIG. 8 is a diagram for MAC PDU consisting of MAC header, MAC control elements (CEs), MAC SDUs and padding.

To support priority handling, multiple logical channels, where each logical channel has its own RLC entity, can be multiplexed into one transport channel by the MAC layer. At the receiver, the MAC layer handles the corresponding demultiplexing and forwards the RLC PDUs to their respective RLC entity for in-sequence delivery and the other functions handled by the RLC. To support the demultiplexing at the receiver, a MAC header, shown in FIG. 8, is used.

To each RLC PDU, there is an associated sub-header in the MAC header. The subheader contains the identity of the logical channel (LCID) from which the RLC PDU originated and the length of the PDU in bytes. There is also a flag indicating whether this is the last sub-header or not. One or several RLC PDUs, together with the MAC header and, if necessary, padding to meet the scheduled transport-block size, form one transport block which is forwarded to the physical layer.

In addition to multiplexing of different logical channels, the MAC layer can also insert the so-called MAC control elements into the transport blocks to be transmitted over the transport channels. A MAC control element is used for inband control signaling—for example, timing-advance commands and random-access response. Control elements are identified with reserved values in the LCID field, where the LCID value indicates the type of control information. Furthermore, the length field in the sub-header is removed for control elements with a fixed length.

A MAC PDU header consists of one or more MAC PDU subheaders; each subheader corresponds to either a MAC SDU, a MAC control element or padding.

MAC PDU subheaders have the same order as the corresponding MAC SDUs, MAC control elements and padding. MAC control elements are always placed before any MAC SDU.

Padding occurs at the end of the MAC PDU, except when single-byte or two-byte padding is required. Padding may have any value and the UE shall ignore it. When padding is performed at the end of the MAC PDU, zero or more padding bytes are allowed.

When single-byte or two-byte padding is required, one or two MAC PDU subheaders corresponding to padding are placed at the beginning of the MAC PDU before any other MAC PDU subheader. A maximum of one MAC PDU can be transmitted per transport block (TB) per UE. A maximum of one MCH MAC PDU can be transmitted per TTI.

When a MAC entity receives a MAC PDU for the MAC entity's C-RNTI or Semi-Persistent Scheduling C-RNTI, or by the configured downlink assignment, or on SL-SCH, containing reserved or invalid values, the MAC entity shall discard the received PDU.

When a MAC entity receives a MAC PDU on MCH containing reserved values, the MAC entity shall ignore the MAC PDU subheaders containing reserved values and the corresponding MAC SDUs, and ignore the fields containing reserved values and the fields associated with the fields containing reserved values in the MAC control elements.

FIGS. 9A and 9B are examples for MAC PDU subheader structures.

A MAC PDU subheader consists of the six header fields R/R/E/LCID/F/L but for the last subheader in the MAC PDU and for fixed sized MAC control elements. The last subheader in the MAC PDU and subheaders for fixed sized MAC control elements consist solely of the four header fields R/R/E/LCID. A MAC PDU subheader corresponding to padding consists of the four header fields R/R/E/LCID.

The MAC header is of variable size and consists of the following fields:

1) LCID: The Logical Channel ID field identifies the logical channel instance of the corresponding MAC SDU or the type of the corresponding MAC control element or padding as described in Tables 1, 2 and 3 for the DL-SCH, UL-SCH and MCH respectively. There is one LCID field for each MAC SDU, MAC control element or padding included in the MAC PDU. In addition to that, one or two additional LCID fields are included in the MAC PDU, when single-byte or two-byte padding is required but cannot be achieved by padding at the end of the MAC PDU. A UE of Category 0 shall indicate CCCH using LCID "01011", otherwise the UE shall indicate CCCH using LCID "00000". The LCID field size is 5 bits.

TABLE 1

| Index | LCID values |
| --- | --- |
| 00000 | CCCH |
| 00001-01010 | Identity of the logical channel |
| 01011-11001 | Reserved |
| 11010 | Long DRX Command |
| 11011 | Activation/Deactivation |
| 11100 | UE Contention Resolution Identity |
| 11101 | Timing Advance Command |
| 11110 | DRX Command |
| 11111 | Padding |

Table 1 shows Values of LCID for DL-SCH.

TABLE 2

| Index | LCID values |
| --- | --- |
| 00000 | CCCH |
| 00001-01010 | Identity of the logical channel |
| 01011 | CCCH |
| 01100-10101 | Reserved |
| 10110 | Truncated Sidelink BSR |
| 10111 | Sidelink BSR |
| 11000 | Dual Connectivity Power Headroom Report |
| 11001 | Extended Power Headroom Report |
| 11010 | Power Headroom Report |
| 11011 | C-RNTI |
| 11100 | Truncated BSR |
| 11101 | Short BSR |

TABLE 2-continued

| Index | LCID values |
| --- | --- |
| 11110 | Long BSR |
| 11111 | Padding |

Table 2 shows Values of LCID for UL-SCH.

TABLE 3

| Index | LCID values |
| --- | --- |
| 00000 | MCCH (see note) |
| 00001-11100 | MTCH |
| 11101 | Reserved |
| 11110 | MCH Scheduling Information or Extended MCH Scheduling Information |
| 11111 | Padding |

NOTE:
If there is no MCCH on MCH, an MTCH could use this value.

Table 3 shows Values of LCID for MCH.

2) L: The Length field indicates the length of the corresponding MAC SDU or variable-sized MAC control element in bytes. There is one L field per MAC PDU subheader except for the last subheader and subheaders corresponding to fixed-sized MAC control elements. The size of the L field is indicated by the F field.

3) F: The Format field indicates the size of the Length field as indicated in Table 4. There is one F field per MAC PDU subheader except for the last subheader and subheaders corresponding to fixed-sized MAC control elements. The size of the F field is 1 bit. If the size of the MAC SDU or variable-sized MAC control element is less than 128 bytes, the value of the F field is set to 0, otherwise it is set to 1.

TABLE 4

| Index | Size of Length field (in bits) |
| --- | --- |
| 0 | 7 |
| 1 | 15 |

Table 4 shows Values of F field.

4) E: The Extension field is a flag indicating if more fields are present in the MAC header or not. The E field is set to "1" to indicate another set of at least R/R/E/LCID fields. The E field is set to "0" to indicate that either a MAC SDU, a MAC control element or padding starts at the next byte.

5) R: Reserved bit, set to "0".

Meanwhile, in a MAC entity, Logical Channel ID (LCID) identifies a logical channel of a MAC SDU or specifies type of a MAC control element included in a MAC PDU. As new types of MAC CEs have been introduced by supporting new features in LTE (e.g., Rel-13 enhanced carrier aggregation), there are not many remaining LCID values. Specifically, 15 values (i.e., 01011-11001 in Table 1) are reserved for downlink, and 10 values (i.e., 01100-10101 in Table 2) are reserved for uplink. When considering the features which are either currently on-going in LTE or would be introduced in the near future, those reserved LCID values would eventually be exhausted and more LCID values (i.e., extension of LCID field) would be required.

However, extension of LCID field naturally leads to longer MAC subheader, and longer MAC subheader is not always welcome in terms of signaling overhead. In the meanwhile, it is also important in LTE to consider the future extensibility so that introduction of a new format wouldn't occur so frequently. Thus, a new MAC subheader should be designed by considering both of future extensibility and signaling overhead.

Therefore, in the present invention, it is invented that an extended MAC PDU includes an extended LCID value indicator (eLCIDIndicator) indicating that an extended LCID value is included in the MAC PDU, wherein the eLCIDIndicator is one of the non-extended LCID values. Hereinafter, non-extended LCID (i.e., LCID used in the prior art, as described in TS 36.321 version 12.7.0) refers an LCID which is of 5 bits.

In the present invention, a MAC PDU may include i) An extended LCID indicator (eLCIDIndicator) and an extended LCID value; or ii) A non-extended LCID value. A UE may be configured by an eNB to use the extended LCID or not.

The eLCIDIndicator is a pre-defined value, which is one of the non-extended LCID values as follows: i) One of the non-extended LCID values assigned for Reserved values (e.g., 11001 for downlink, or 10101 for uplink): or ii) One of the non-extended LCID values assigned for Identity of the logical channel (e.g., 01010 for downlink, or 01010 for uplink).

When a transmitter (i.e., a MAC transmitter) generates a MAC PDU, if the transmitter generates the MAC PDU including the extended LCID, the transmitter shall: i) set the non-extended LCID field to the value indicating eLCIDIndicator; ii) include the extended LCID in the next byte of the eLCIDIndicator, iii) optionally, include length field in the next byte of the extended LCID field; and iv) include the MAC SDU, MAC CE or padding indicated by the extended LCID. The transmitter sends the generated MAC PDU to the receiver.

When a receiver (i.e., a MAC receiver) receives a MAC PDU, if the LCID field is set to the value indicating eLCIDIndicator, the receiver shall: i) consider that the extended LCID field is included in the next byte of the eLCIDIndicator; and ii) consider that the MAC SDU, MAC CE or padding indicated by the extended LCID field is included in the MAC PDU.

More detailed explanations of the transmitter's and the receiver's operation will be described with reference to FIGS. 10 and 11 respectively.

FIG. 10 is conceptual diagram for a transmitter's operation for transmitting a MAC PDU according to an exemplary embodiment of the present invention.

In descriptions with reference to FIG. 10, the transmitter may be a MAC transmitter in a UE side or in an eNB side.

Referring to FIG. 10, when a MAC protocol data unit (PDU) including a LCID field and an extended LCID (eLCID) is to be generated, the transmitter sets a logical channel identity (LCID) field in a medium access control (MAC) subheader to a first value (i.e., a value indicating eLCIDIndicator, examples of the eLCIDIndicator is shown in Tables 5 to 7 below) indicating that the eLCID field is included in the MAC subheader (S1001).

Preferably, the first value is pre-defined as one of values of the LCID field which are assigned for reserved values or assigned for identities of each logical channel. More specifically, if the transmitter is a MAC transmitter in a UE side (i.e., in uplink case), the first value may be pre-defined as a value among 01100-10101 (i.e., Reserved values) in Table 2. Or, the first value may be pre-defined as a value among 00001-01010 (i.e., Identities of logical channels) in Table 2. If the transmitter is a MAC transmitter in an eNB side (i.e., in downlink case), the first value may be predefined as a value among 01011-11001 (i.e., Reserved values) in Table 1.

Or, the first value may be pre-defined as a value among 00001-01010 (i.e., Identities of logical channels) in Table 1.

Meanwhile, a MAC PDU is commonly to be generated when the transmitter receives a MAC SDU from an upper layer or when the transmitter generates a MAC control element (CE).

In some embodiments, in case that the transmitter is a MAC transmitter in a UE side, the UE (i.e., the MAC transmitter in the UE side) may generate a MAC PDU including the LCID field and the eLCID field when the UE is configured by an eNB to generate the MAC PDU including the LCID field and the eLCID field.

In some embodiments, in case that the transmitter is a MAC transmitter in an eNB side, the eNB may configure a UE to receive the MAC PDU including the LCID field and the eLCID field when the eNB generates the MAC PDU including the LCID field and the eLCID field.

Then, the transmitter sets the eLCID field to a second value identifying a logical channel of a MAC service data unit (SDU) or a type of a MAC CE (S1003), and generates and transmits a MAC PDU including the LCID field and the eLCID field, and the MAC SDU or the MAC CE (S1005).

Preferably, the LCID field is followed by the eLCID field in a MAC subheader, as shown in FIGS. 12A and 12B.

In some embodiments, the MAC subheader may further include a length field indicating a length of the MAC SDU or the MAC CE, and the eLCID field is followed by the length field in the MAC subheader, as shown in FIG. 12A.

FIG. 11 is conceptual diagram for a receiver's operation for receiving a MAC PDU according to an exemplary embodiment of the present invention.

In descriptions with reference to FIG. 11, the receiver may be a MAC receiver in a UE side or in an eNB side.

Referring to FIG. 10, the receiver receives a MAC PDU from a lower layer (S1101).

After receiving the MAC PDU, the receiver determines that a value of a LCID field in a MAC subheader included in the MAC PDU is set to a specific value (i.e., a value indicating eLCIDIndicator) indicating that an extended LCID field is included in the MAC subheader (S1103). That is, the receiver may check a value of the LCID field, and if the value of the LCID field is set to the specific value, the receiver considers that the extended LCID field is included in the MAC subheader.

After that, the receiver identifies a logical channel of a MAC SDU or a type of a MAC CE included in the MAC PDU based on the eLCID field (S1105). That is, the receiver considers that a MAC SDU or a type of a MAC CE included in the MAC PDU is indicated by the eLCID field.

Preferably, the specific value is pre-defined as one of values of the LCID field which are assigned for reserved values or assigned for identities of each logical channel. More specifically, if the receiver is a MAC receiver in an eNB side (i.e., in uplink case), the specific value may be pre-defined as a value among 01100-10101 (i.e., Reserved values) in Table 2. Or, the specific value may be pre-defined as a value among 00001-01010 (i.e., Identities of logical channels) in Table 2. If the receiver is a MAC receiver in a UE side (i.e., in downlink case), the specific value may be predefined as a value among 01011-11001 (i.e., Reserved values) in Table 1. Or, the specific value may be pre-defined as a value among 00001-01010 (i.e., Identities of logical channels) in Table 1.

FIGS. 12A and 12B show an example of MAC subheader format according to an exemplary embodiment of the present invention.

In descriptions with reference to FIGS. 12A and 12B, the MAC header is of variable size and consists of the following fields:

1) LCID: The Logical Channel ID field identifies the logical channel instance of the corresponding MAC SDU or the type of the corresponding MAC control element or padding as described in Tables 5, 6 and 7 for the DL-SCH, UL-SCH and MCH respectively. There is one LCID field for each MAC SDU. MAC control element or padding included in the MAC PDU. In addition to that, one or two additional LCID fields are included in the MAC PDU, when single-byte or two-byte padding is required but cannot be achieved by padding at the end of the MAC PDU. A UE of Category 0 shall indicate CCCH using LCID "01011", otherwise the UE shall indicate CCCH using LCID "00000". The LCID field size is 5 bits. If the LCID field is set to an eLCIDIndicator (shown in Tables 5, 6 and 7 below), the LCID field indicates the Extended LCID field is present after the LCID field.

TABLE 5

| Index | LCID values |
| --- | --- |
| 00000 | CCCH |
| 00001-01010 | Identity of the logical channel |
| 01011 | eLCIDIndicator |
| 01100-11001 | Reserved |
| 11010 | Long DRX Command |
| 11011 | Activation/Deactivation |
| 11100 | UE Contention Resolution Identity |
| 11101 | Timing Advance Command |
| 11110 | DRX Command |
| 11111 | Padding |

Table 5 shows Values of LCID for DL-SCH according to an exemplary embodiment of the present invention.

TABLE 6

| Index | LCID values |
| --- | --- |
| 00000 | CCCH |
| 00001-01010 | Identity of the logical channel |
| 01011 | CCCH |
| 01100 | eLCIDEndicator |
| 01101-10101 | Reserved |
| 10110 | Truncated Sidelink BSR |
| 10111 | Sidelink BSR |
| 11000 | Dual Connectivity Power Headroom Report |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

Table 6 shows Values of LCID for UL-SCH according to an exemplary embodiment of the present invention.

TABLE 7

| Index | LCID values |
| --- | --- |
| 00000 | MCCH (see note) |
| 00001-11100 | MTCH |
| 11101 | eLCIDIndicator |

TABLE 7-continued

| Index | LCID values |
| --- | --- |
| 11110 | MCH Scheduling Information or Extended MCH Scheduling Information |
| 11111 | Padding |

NOTE:
If there is no MCCH on MCH, an MTCH could use this value.

Table 7 shows Values of LCID for MCH according to an exemplary embodiment of the present invention.

2) eLCID: The Extended Logical Channel ID field identifies the logical channel instance of the corresponding MAC SDU or the type of the corresponding MAC control element for the DL-SCH, UL-SCH and MAC respectively. There is one LCID field for each MAC SDU or MAC control element included in the MAC PDU.

3) L: The Length field indicates the length of the corresponding MAC SDU or variable-sized MAC control element in bytes. There is one L field per MAC PDU subheader except for the last subheader and subheaders corresponding to fixed-sized MAC control elements. The size of the L field is indicated by the F field.

4) F: The Format field indicates the size of the Length field as indicated in Table 4. There is one F field per MAC PDU subheader except for the last subheader and subheaders corresponding to fixed-sized MAC control elements. The size of the F field is 1 bit. If the size of the MAC SDU or variable-sized MAC control element is less than 128 bytes, the value of the F field is set to 0, otherwise it is set to 1.

5) E: The Extension field is a flag indicating if more fields are present in the MAC header or not. The E field is set to "1" to indicate another set of at least R/R/F/LCID fields. The E field is set to "0" to indicate that either a MAC SDU, a MAC control element or padding starts at the next byte or next byte of R/R/E/eLCID field.

6) R: Reserved bit, set to "0".

Referring to FIG. 12A, a MAC PDU subheader consists of six header fields R/R/E/LCID/eLCID/F/L. A size of the L field may be 7-bits or 15-bits, and a size of the eLCID field may be 8 bits, as shown in FIG. 12A. The MAC PDU subheader consisting of the six header fields R/R/E/LCID/eLCID/F/L is but for the last subheader in the MAC PDU and for fixed sized MAC control elements.

Referring to FIG. 12B, a MAC PDU subheader consists of four header fields R/R/E/LCID/eLCID. A size of the eLCID field may be 8 bits, as shown in FIG. 12B. The last subheader in the MAC PDU and subheaders for fixed sized MAC control elements consist solely of the four header fields R/R/E/LCID/eLCID. A MAC PDU subheader corresponding to padding consists of the four header fields R/R/E/LCID/eLCID.

FIGS. 13A to 13C show another example of MAC subheader format according to an exemplary embodiment of the present invention.

In descriptions with reference to FIGS. 13A to 13C, the MAC header is of variable size and consists of the following fields:

1) LCID: The Logical Channel ID field identities the logical channel instance of the corresponding MAC SDU or the type of the corresponding MAC control element or padding as described in Tables 5,6 and 7 for the DL-SCH, UL-SCH and MCH respectively. There is one LCID field for each MAC SDU, MAC control element or padding included in the MAC PDU. In addition to that, one or two additional LCID fields are included in the MAC PDU, when single-byte or two-byte padding is required but cannot be achieved by padding at the end of the MAC PDU. A UE of Category 0 shall indicate CCCH using LCID "01011", otherwise the UE shall indicate CCCH using LCID "00000". The LCID field size is 5 bits. If the LCID field is set to an eLCIDIndicator (shown in above Tables 5, 6 and 7), the LCID field indicates the Extended LCID field is present after the LCID field.

2) eLCID: The Extended Logical Channel ID field identifies the logical channel instance of the corresponding MAC SDU or the type of the corresponding MAC control element for the DL-SCH, UL-SCH and MAC respectively. There is one LCID field for each MAC SDU or MAC control element included in the MAC PDU.

3) L: The Length field indicates the length of the corresponding MAC SDU or variable-sized MAC control element in bytes. There is one L field per MAC PDU subheader except for the last subheader and subheaders corresponding to fixed-sized MAC control elements. The size of the L field is indicated by the F field.

4) F: The Format field indicates the size of the Length field as indicated in Table 4. There is one F field per MAC PDU subheader except for the last subheader and subheaders corresponding to fixed-sized MAC control elements. The size of the F field is 1 bit. If the size of the MAC SDU or variable-sized MAC control element is less than 128 bytes, the value of the F field is set to 0, otherwise it is set to 1.

5) E: The Extension field is a flag indicating if more fields are present in the MAC header or not. The E field is set to "1" to indicate another set of at least R/R/E/LCID fields. The E field is set to "0" to indicate that either a MAC SDU, a MAC control element or padding starts at the next byte or next byte of R/R/E/eLCID field.

6) R: Reserved bit, set to "0".

7) F2: The F2 field shown in FIG. 13C may have the similar functionality as the legacy F field. That is, F2 field may be set to 1 when 16 bits L field is used. Or, F2 field may be set to 0 when 8 bits L field is used.

Referring to FIG. 13A, a MAC PDU subheader consists of six header fields R/R/E/LCID/R/R/R/eLCID/F/L. A size of the L field may be 7-bits or 15-bits, and a size of the eLCID field may be 5 bits, as shown in FIG. 13A. The MAC PDU subheader consisting of the six header fields R/R/E/LCID/R/R/R/eLCID/F/L is but for the last subheader in the MAC PDU and for fixed sized MAC control elements.

Referring to FIG. 13B, a MAC PDU subheader consists of four header fields R/R/E/LCID/R/R/R/eLCID. A size of the eLCID field may be 5 bits, as shown in FIG. 13B. The last subheader in the MAC PDU and subheaders for fixed sized MAC control elements consist solely of the four header fields R/R/E/LCID/R/R/R/eLCID. A MAC PDU subheader corresponding to padding consists of the four header fields R/R/E/LCID/R/R/R/eLCID.

Referring to FIG. 13C, a MAC PDU subheader consists of six header fields R/R/E/LCID/R/R/F2/eLCID/L. In this format, in an octet containing R/R/R/eLCID, one of R bits can used as an indicator of using 16 bits L field (i.e., F2 field). F2 field may be set to 1 when 16 bits L field is used. Or, F2 field may be set to 0 when 8 bits L field is used.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', Base Station (BS), 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from essential characteristics of the present invention. The above embodiments are therefore to be construed in all aspects as illustrative and not restrictive. The scope of the invention should be determined by the appended claims, not by the above description, and all changes coming within the meaning of the appended claims are intended to be embraced therein.

INDUSTRIAL APPLICABILITY

While the above-described method has been described centering on an example applied to the 3GPP LTE system, the present invention is applicable to a variety of wireless communication systems in addition to the 3GPP LTE system.

What is claimed is:

1. A method for a device operating in a wireless communication system, the method comprising:
generating a MAC protocol data unit (PDU) including a MAC PDU subheader, the MAC PDU subheader including a first octet of 8 bits followed by a second octet of 8 bits,
wherein the first octet includes a logical channel identity (LCID) field consisting of 5 bits; and
transmitting the generated MAC PDU to a second device in the wireless communication system,
wherein, based on the 5 bits of the LCID field being set to a specific value, the LCID field indicates that the second octet includes an extended LCID (eLCID) field comprising more than 5 bits that identify either a corresponding logical channel of a MAC service data unit (SDU) or a corresponding type of a MAC control element (CE),
otherwise, the eLCID is not included in the MAC PDU subheader and the 5 bits of the LCID field identify either a corresponding logical channel of a MAC SDU or a corresponding type of a MAC CE, and
wherein the generated MAC PDU further includes either a MAC SDU or a MAC CE corresponding to a respective one of the LCID or eLCID.

2. The method of claim 1,
wherein the MAC PDU subheader further includes a length field indicating a length of the MAC SDU or the MAC CE, and
wherein the eLCID field is followed by the length field in the MAC PDU subheader.

3. The method of claim 1, wherein the device is a base station (BS) and the second device is a user equipment (UE).

4. The method of claim 1, wherein the device is a user equipment (UE) and the second device is a base station (BS).

5. The method of claim 1, wherein the device is configured by the second device to generate the MAC PDU.

6. A device operating in a wireless communication system, the device comprising:
a memory;
a transceiver; and
a processor operatively connected to the memory and the transceiver, the processor configured for:
generating a MAC protocol data unit (PDU) including a MAC PDU subheader, the MAC PDU subheader including a first octet of 8 bits followed by a second octet of 8 bits,
wherein the first octet includes a logical channel identity (LCID) field consisting of 5 bits; and
transmitting the generated MAC PDU to a second device in the wireless communication system,
wherein, based on the 5 bits of the LCID field being set to a specific value, the LCID field indicates that the second octet includes an extended LCID (eLCID) field comprising more than 5 bits that identify either a corresponding logical channel of a MAC service data unit (SDU) or a corresponding type of a MAC control element (CE),
otherwise, the eLCID is not included in the MAC PDU subheader and the 5 bits of the LCID field identify either a corresponding logical channel of a MAC SDU or a corresponding type of a MAC CE, and
wherein the generated MAC PDU further includes either a MAC SDU or a MAC CE corresponding to a respective one of the LCID or eLCID.

7. The device of claim 6,
wherein the MAC PDU subheader further includes a length field indicating a length of the MAC SDU or the MAC CE, and
wherein the eLCID field is followed by the length field in the MAC subheader.

8. The device of claim 6, wherein the device is a base station (BS) and the second device is a user equipment (UE).

9. The device of claim 6, wherein the device is a user equipment (UE) and the second device is a base station (BS).

10. The device of claim 6, wherein the device is configured by the second device to generate the MAC PDU.

11. A method for a device operating in a wireless communication system, the method comprising:

receiving, from a second device in the wireless communication system, a MAC protocol data unit (PDU) including a MAC PDU subheader, the MAC PDU subheader including a first octet of 8 bits followed by a second octet of 8 bits, wherein the first octet includes a logical channel identity (LCID) field consisting of 5 bits; and decoding the MAC PDU, wherein, based on the 5 bits of the LCID field being set to a specific value, the LCID field indicates that the second octet includes an extended LCID (eLCID) field comprising more than 5 bits that identify either a corresponding logical channel of a MAC service data unit (SDU) or a corresponding type of a MAC control element (CE), otherwise, the eLCID is not included in the MAC PDU subheader and the 5 bits of the LCID field identify either a corresponding logical channel of a MAC SDU or a corresponding type of a MAC CE, and wherein the MAC PDU further includes either a MAC SDU or a MAC CE corresponding to a respective one of the LCID or eLCID.

12. The method of claim 11, wherein the MAC PDU subheader further includes a length field indicating a length of the MAC SDU or the MAC CE, and wherein the eLCID field is followed by the length field in the MAC subheader.

13. The method of claim 11, wherein the device is a base station (BS) and the second device is a user equipment (UE).

14. The method of claim 11, wherein the device is a user equipment (UE) and the second device is a base station (BS).

15. A device operating in a wireless communication system, the device comprising:

a memory;

a transceiver; and a processor operatively connected to the memory and the transceiver, the processor configured for:

receiving, from a second device in the wireless communication system, a MAC protocol data unit (PDU) including a MAC PDU subheader, the MAC PDU subheader including a first octet of 8 bits followed by a second octet of 8 bits, wherein the first octet includes a logical channel identity (LCID) field consisting of 5 bits; and decoding the MAC PDU, wherein, based on the 5 bits of the LCID field being set to a specific value, the LCID field indicates that the second octet includes an extended LCID (eLCID) field comprising more than 5 bits that identify either a corresponding logical channel of a MAC service data unit (SDU) or a corresponding type of a MAC control element (CE), otherwise, the eLCID is not included in the MAC PDU subheader and the 5 bits of the LCID field identify either a corresponding logical channel of a MAC SDU or a corresponding type of a MAC CE, and wherein the generated MAC PDU further includes either a MAC SDU or a MAC CE corresponding to a respective one of the LCID or eLCID.

16. The device of claim 15, wherein the MAC PDU subheader further includes a length field indicating a length of the MAC SDU or the MAC CE, and wherein the eLCID field is followed by the length field in the MAC subheader.

17. The device of claim 15, wherein the device is a base station (BS) and the second device is a user equipment (UE).

18. The device of claim 15, wherein the device is a user equipment (UE) and the second device is a base station (BS).

19. The device of claim 15, wherein the device is configured by the second device to generate the MAC PDU.

* * * * *